Patented June 14, 1949

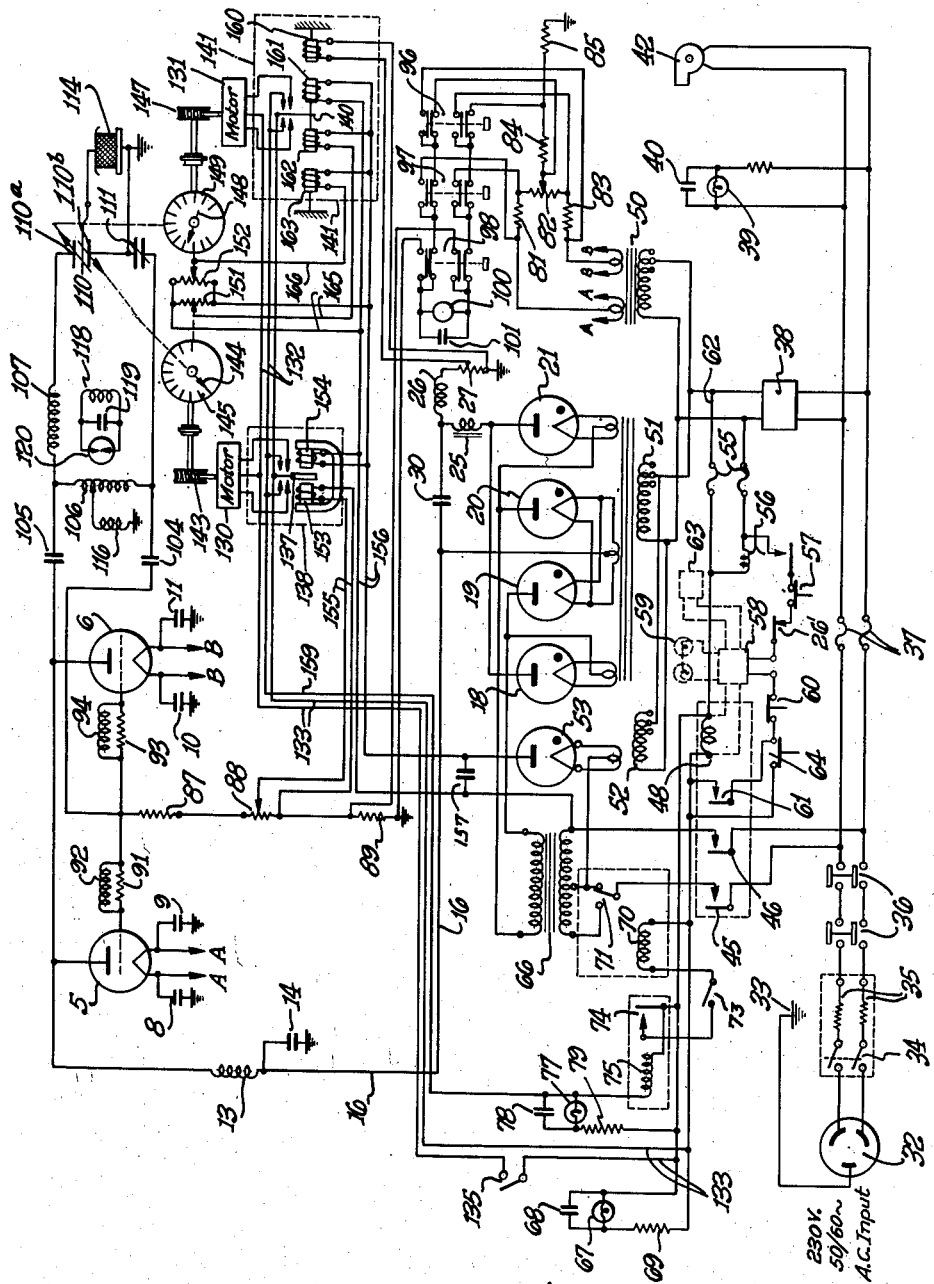

2,473,188

UNITED STATES PATENT OFFICE 2,473,188

RADIO-FREQUENCY DIELECTRIC HEATER WITH CONSTANT HEATING RATE CONTROL

Frederick G. Albin, Los Angeles, Calif., assignor to Radio Corporation of America, a corporation of Delaware Application June 17, 1944, Serial No. 540,767

5 Claims. (Cl. 250—36)

This invention relates to high or radio frequency generators for industrial heating purposes, and particularly to such a generator which is completely automatic in its operation from the standpoint of being independent of size or shape of the material to be heated within predetermined limits.

The use of radio frequency for inducing heat into material for various purposes is well-known in the art. For instance, radio frequency heating is used for setting glues in ply-wood manufacture and to heat preforms in the plastic molding industry. The present invention is particularly applicable to the use of radio frequency for heating successively a number of plastic preforms of different sizes and shapes, the system providing a constant predetermined heating rate regardless of the area or thickness of the preform to be heated. In the past, it has been necessary to vary the output voltage or current by "tuning" the load circuit. This required a complex procedure and the manipulation of a plurality of controls for obtaining resonance and impedance transformation of the desired degree in order to obtain the desired rate of heating of the material. Because of this complexity, any automatic control by load variations was heretofore not considered feasible.

In the present invention, it is only necessary to pre-establish an optimum heating rate in watts per cubic unit of the particular type of material after which the automatic controls maintain this heating rate independently of the area or the thickness of the specimens and of the electrical characteristics of the material which change during the heating period.

In my copending application, Ser. No. 560,465, filed October 26, 1944, Patent No. 2,442,451, dated June 1, 1948, the mechanical features residing in the size, shape, and arrangement of electrodes and in the safety features of the unit are disclosed in detail and claimed, the present application being directed to and claiming the circuit elements which provide the system with a constant heating rate and automatic circuit controls.

An object of the invention, therefore, is to facilitate the operation of a radio frequency dielectric heating system.

Another object of the invention is to provide an improved method of supplying radio frequency heat to material specimens differing in size and shape.

A further object of the invention is to provide an improved oscillator-generator system which is completely automatic in its operation.

A further object of the invention is to provide an oscillator adapted to provide automatically a constant heating rate for material specimens of different sizes and shapes.

A still further object of the invention is to provide an oscillator-generator system which is automatically adjusted with respect to voltage and power output in accordance with the size and shape of the specimens of material being heated.

A still further object of the invention is to provide an industrial heating generator with automatic output controls and automatic safety controls operative when the output exceeds a predetermined value or the period of automatic adjustment exceeds a predetermined time.

Although the novel features which are believed to be characteristic of this invention will be pointed out with particularity in the appended claims, the manner of its organization and the mode of its operation will be better understood by referring to the following description read in conjunction with the accompanying drawing forming a part hereof, in which the single figure is a schematic diagram of a high frequency generator embodying the invention.

In general, the circuit shown in the diagram is an oscillator of the self exciting type employing two oscillator tubes 5 and 6 connected in parallel, the filaments of which are supplied with alternating heating current over a transformer 50, while the radio frequency circuits through the filaments are connected over respective condensers 8, 9, 10, and 11. The plates or anodes of the oscillator tubes 5 and 6 are supplied with direct current potential over a reactor 13, by-passed by condenser 14, and conductor 16 from the high side of rectifier tubes 18, 19, 20, and 21 connected in a bridge arrangement, the remainder of the plate circuit being over filter choke 25, relay coil 26, and a potentiometer resistor 27, the current flowing in the latter element being proportional to the watts taken by the load when the D. C. voltage across condenser 30 is constant, which it is.

Power is supplied to the generator from any suitable single phase source, such as a 230 volt 50 or 60 cycle line connected at plug 32. One of the three plug conductors is grounded to the frame at 33, and the other two conductors are connected to a main switch 34, overload thermal-tripping resistors 35, safety switches 36 on the doors of the cabinet containing the generator, fuses 37 to a voltage regulator 38, an indicating "on" lamp 39, shunted by a condenser 40, a cooling blower 42, and a pair of normally open contacts 45 and 46 of a relay 48. Thus, when switch 34 is closed, power is supplied to the voltage regulator and the blower 42 and the lamp 39 are energized.

From the voltage regulator, one circuit feeds the primary of the transformer 50 for supplying heating current to the filaments of tubes 5 and 6, the primary of transformer 51 for heating the filaments of rectifier tubes 18, 19, 20, and 21, and the primary of transformer 52 for heating the filament of a single rectifier tube 53. The other circuit from the voltage regulator 38 is connected over fuses 55 to a time delay relay 56 of any suitable type for providing a delay of approximately 30 seconds to allow for proper stabilization of the vaporization and condensation of the mercury in the rectifier tubes before the plate voltage is impressed thereon. The next element in this circuit is a safety switch 57 which is closed only when the safety cage or guard over the work electrodes is in position to protect the operator, as described in detail in my above-mentioned co-pending application. Following switch 57 are contacts 26' of relay coil 26, which are opened when the plate current of the oscillator is abnormally high. Next comes an interval timing mechanism 58 for energizing a pair of infrared lamps 59 and for energizing an electric door latch 63 for releasing the safety cage and disconnecting the high voltage from the oscillator after a predetermined time interval. This mechanism is described in detail in my above-mentioned co-pending application.

The next element in this circuit is a normally closed manual stop switch 60, the circuit then branching to a normally open contact 61 on relay 48, and the coil of relay 48, and back over conductor 62 to the voltage regulator 38. The other branch goes to a normally open start switch 64 and then to the coil of relay 48, and back to regulator 38. The closing of start switch 64 will supply energy to the coil of relay 48 which will cause the relay to close its contacts 45, 46, and 61. The closing of contact 61 will now supply energy to the coil of relay 48 over closed stop switch 60, thus permitting the start switch 64 to be opened while maintaining the energizing circuit to the coil of relay 48 is closed. Thus, relay 48 is a holding relay, and when once energized will connect alternating current energy to the plates of the rectifier tubes over contacts 45 and 46 through transformer 66. Simultaneously, an indicator lamp 67, shunted by a condenser 68, is energized to show that power is being supplied to the rectifier transformer 66, this indicator lamp being associated with a resistor 69 to lessen the current through lamp 67.

Connected across the second circuit from regulator 38, when a manual switch 73 and a relay contact 74 are closed, is a coil 70 having an armature and a pair of contacts 71. The contact 74 is normally open except upon energization of its coil 75. When the coil 70 is de-energized, the right-hand contact 71 will be made to supply high power to the rectifier tubes 18, 19, 20, and 21 over transformer 66, and when the coil 70 is energized, the left-hand contact will be made to supply less energy to the plates of the rectifier tubes. Thus, with contact 74 closed, it is only necessary to close the switch 73 to reduce the voltage on the rectifier tubes. Similarly, if relay coil 75 is energized when switch 73 is closed, coil 70 will be energized and low power will be impressed on the rectifier tubes. This is an overload safety feature for the oscillator, and will be explained hereinafter. When a low power condition exists by the energization of coil 75, a circuit is closed through an indicator lamp 77, with a shunting condenser 78 and a protective resistance 79 to indicate that the system is operating on low power. The relay 74—75 has a time delay of approximately three seconds to prevent its operation and the switch over to low power if overloads exist for shorter periods than this, such overload periods being within the safety limits of the system.

Referring now to the filament heating circuit for the tubes 5 and 6, as mentioned above, power for these tubes is supplied over transformer 50. The midtaps of the secondary windings of the transformer 50 have connected thereto a resistance network of resistors 81, 82, 83, 84, and 85. These resistors are connected between ground and the filaments of the tubes 5 and 6, resistors 85 being many times the largest value in the network. The voltage drop across these resistors serves as a portion of the grid bias potential for the tubes 5 and 6.

As mentioned above, the tubes 5 and 6 are connected in parallel and the grid leak circuit includes resistors 87, 88, and 89 in series. A blocking capacitor is provided at 104. Also included in parallel from the grids of tubes 5 and 6, are a resistor 91, shunted by a reactor 92, and a resistor 93 shunted by a reactor 94, these combinations being parasitic oscillation suppressors.

Connected across resistors 81, 83, and 84 are a plurality of switches 96, 97, and 98, in association with a milliammeter 100 shunted by condenser 101. The resistor 84 supplies a potential which is conducted through the normally closed contacts of switches 96, 97, and 98 to the meter 100, where the indication is directly proportional to the current through the resistor 84 and consequently proportional to the combined space currents of tubes 5 and 6. When only the switch 97 is actuated, only the potential across resistor 81 will be connected to the meter 100 and only the space current of tube 5 will be indicated on the meter 100. Resistor 83 is similarly connected through switch 96 which, when actuated, will permit the meter 100 to indicate only the space current of tube 6. Resistor 82 is a balancing potentiometer and provides a manual control of the relative grid bias potentials on the two tubes 5 and 6, enabling the space currents thereof to be equalized. Switch 98 is connected across grid leak resistor 89, and when actuated, serves to indicate the current in the grid leak circuit. This circuit arrangement thereby normally indicates the total space current of the oscillator, but will indicate the space current of each tube individually, or a grid leak current on the same meter by simply pressing the appropriate switch button.

The oscillating portion of the circuit includes a plate blocking capacitor 105, a reactor 106, a reactor 107, a three-electrode variable condenser assembly 110, and a two-electrode variable condenser 111, together with the capacitance of the load 114 placed between applicator electrodes which are connected to the central variable electrode of condenser assembly 110 and its variable bottom electrode which is also connected to the grounded top electrode of condenser 111. For convenience the upper section of condenser assembly 110 has been designated capacitor 110$^a$, while the lower section has been designated as capacitor 110$^b$. A reactor 116 is connected from inductor 106 to ground to bleed off the static charge from the tank circuit. A tuned circuit is shown consisting of an inductance 118, a capacitor 119, and an indicating lamp 120, in combination, which serves as a wave indicator to indicate when the tank circuit is properly tuned to a predetermined frequency. Inductance 118 may be coupled to either inductance 106 or inductance 107, lamp 120 being preferably a gas filled lamp which will illuminate when the oscillator frequency is in resonance with the wave indicator circuit. In this arrangement, reactor 106 in combination with reactor 107 constitutes the inductance of the basic oscillator circuit, while the combination of condenser assembly 110, condenser 111, and the capacitance of the load 114 together with certain stray capacitances of the connected tube circuits constitute the tank circuit capacitances of the basic oscillator circuit. Condenser 111 is manually adjustable, and when once set, remains fixed. As mentioned above, condenser 110 is made up of three plates, the lower and center plates of which are automatically adjustable in accordance with variations in area and thickness, respectively, of the material to be heated as will now be explained. It may be observed at this point that condenser assembly 110 is essentially two variable capacitors electrically connected in series and so arranged that as the capacity of one ($110^a$) increases the other ($110^b$) decreases, and vice versa. In addition, one of these capacitors ($110^b$ in this case) is also independently adjustable.

Shown diagrammatically are motors 130 and 131 which are energized over conductors 132 and 133 from the power line when a switch 135 is closed. The motors are reversible, motor 130 rotating in one direction when armature 137 of relay 138 is moved to the left, and rotating in the other direction when the armature 137 is moved to the right. Similarly, for motor 131, which rotates in one direction when armature 140 of relay 141 is moved to the left, and in the other direction when the armature 140 is moved to the right. The motor 130, through a worm and pinion gear arrangement 143, rotates a pointer 144 on a dial 145 calibrated in area variations, rotation of the pointer shaft simultaneously moving the lower plate of condenser 110 toward and away from the central plate in accordance with the direction of rotation of the motor 130. Similarly, the motor 131 is geared through gears 147 to the shaft of a pointer 148 on a dial 149 calibrated in thickness variations and to the center plate or electrode of condenser 110, the central electrode being thereby adjustable between the upper and lower electrodes in accordance with the direction of rotation of the motor 131.

Between the dials 145 and 149, are two potentiometers 151 and 152, potentiometer 151 having its contact simultaneously movable with the shaft of pointer 144, and the contact of potentiometer 152 having its contact simultaneously movable with the shaft of pointer 148. The original adjustments of these elements are such that when the contact of potentiometer 151 is at its extreme bottom position, the pointer on dial 145 indicates zero area. The contact of potentiometer 152 is also at its extreme bottom position when the pointer 148 indicates zero thickness on the dial 149.

As mentioned above, the oscillator circuit is of the type wherein the voltage across capacitance 111 is the grid voltage, and the voltage across capacitances $110^a$ and $110^b$ together with the load capacitance effectively in parallel with $110^b$, is the high frequency plate voltage. Furthermore, if the total of the capacitances 110 and 114 is constant, the grid voltage is constant, and any change in the total capacitance of these elements will cause a change in the high frequency grid voltage, and consequently will cause a corresponding change in direct grid current flowing through resistors 87, 88, and 89. Now, if the load capacitance changes, adjustment of capacitor $110^b$ may be made to return the total capacitance to its predetermined value and to the predetermined tuned frequency of the tank circuit.

A change in the total capacitance is caused by placing between the applicator electrodes specimens of greater or less than normal area, so that a change in the grid voltage across capacitor 111 results, and consequently there is a change in the grid current flowing in resistor 88. This change in grid current causes the motor 130 to be actuated in either of its two directions as will now be explained.

The system is so arranged that it will automatically retune itself when difference in the areas of the work specimens cause a change in the total capacitance of the elements 110 and 114. The voltage developed across resistor 88 is impressed over conductors 155 on the left-hand coil 153 of the double polarized relay 138. To provide a reference point based on optimum operating conditions, the output potential of rectifier 53 is impressed across the right-hand coil 154 of relay 138 over conductors 156. The output of this auxiliary rectifier 53 is used as a reference since it derives its anode voltage from the same primary source as the high voltage transformer 66. The direct current voltage from the rectifier 53 will occur across capacitor 157. Thus, when the oscillator is set for optimum output conditions for a given specimen, the contact on potentiometer 88 is adjusted to provide a balance between the two coils 153 and 154 of relay 138 so that its armature 137 is in neutral position.

If, then, a larger specimen is placed between the applicator electrodes, the increase in load capacitance initially results in a decrease in the combined reactance of the load and condenser 110 combination. An increase in current through condenser 111 now results which causes an increase in potential thereacross. Such an increase in grid excitation results in a corresponding increase in direct grid current which causes a corresponding increase in voltage across resistor 88. This will cause a differential in the flux produced by the two windings 153 and 154 of the relay 138 and will swing the armature to the left to rotate the motor to decrease the capacitance of the condenser $110^b$. By decreasing this capacitance, the voltage across resistor 88 will decrease and bring the differential flux from the two windings of the relay 138 again to zero, and the armature 137 will again assume a neutral position, stopping the motor. The control will operate in an opposite direction if a smaller sample is placed in the applicator.

As another example, assume that the grid current is above normal relative to the plate voltage caused by the load capacitances being too high for the setting of the pointer 144 on the dial 145. In that case, the armature 137 is actuated to the left, which will rotate the motor 130 in a direction which will cause the pointer 144 to increase, thereby restoring the normal over-all tank capacitance, tank current, grid current, and frequency. A reduction of grid current below normal causes the opposite action to take place. As the pointer 144 is moved together with the bottom electrode of condenser $110^b$, the contact of potentiometer 151 is also moved accordingly.

Simultaneous with the closing of the motor contacts by armature 137, a second pair of contacts is also closed thereby supplying a potential to the coil 75 over conductor 159 and one of conductors 133. As mentioned above, this relay has a delay of from two to three seconds after energization, so that if the regulatory period persists for over this length of time, the contact 74 is made, which energizes coil 70 and places the power voltage across the full primary of transformer 66, thus reducing the power to the oscillator and thereby safeguarding the tubes and other circuit components against damage. It will be noted that a simultaneous reduction of potential is made on the two coils 153 and 154 of relay 138, thereby enabling the system to continue to retune itself and reach a balance on low power as well as on high power. When the system has completed its regulation, the armature 137 will assume its neutral position, breaking the circuit of coil 75 and thus restoring the oscillator to the high power condition. From the above, therefore, the motor relay combination 130—138 provides an automatic control for specimens of various areas together with a safety feature which reduces the power supplied to the oscillator if the regulatory period becomes too long for the safety of the apparatus.

The next automatic adjustment which can be accomplished with the present system is to compensate for specimens of various thicknesses independently of their areas. The generator is adjusted to provide an optimum heating rate in watts per cubic unit of material limited by the capacity of the generator. The heating rate is reflected in and is proportional to the current through resistor 27, which current is the plate current of the tubes 5 and 6. Thus, a potential proportional to the plate current flowing through resistor 27 is impressed on a rigidly mounted reference coil 160 of relay 141. The relay 141 is also provided with three additional coils, namely, 161, 162, and 163. The movable coil 161 on armature 140 is excited by direct current proportional to the plate voltage similarly to coil 154 of relay 138 which causes a traction force to be exerted between these coils 160 and 161, which force is proportional to the input power of the oscillator, and assuming a constant efficiency, is proportional to the output power or the power into the load 114. The circuit efficiency is constant, inasmuch as the frequency, current, and resistance of the circuit are constant.

The next coil 162 of relay 141 which is also movable with armature 140 is connected over conductors 165 to area potentiometer 151, while rigidly mounted coil 163 is connected over one of conductors 165 and a conductor 166 to thickness potentiometer 152. As mentioned above, as the shaft of pointer 144 and the contact of potentiometer 151 are adjusted in accordance with the area of the work specimen, the voltage across the potentiometer 151 impressed on coil 162, is proportional to the area of the load. The voltage across potentiometer 152, according to the setting of pointer 143 and as impressed on the coil 163, is adapted to vary in accordance with the thickness of the load. Thus, a traction force exists between coils 162 and 163, which force is proportional to the product of the area and thickness, which product equals the volume of the work specimen. The coils of relay 141 are thus so related that the traction force resulting from the product of area and thickness of the specimen is opposite to the traction force resulting from the product of input voltage and current, the direction of movement of the armature 140 being in accordance with the result of the differenteial products. Thus, when a predetermined ratio of these two products, which is the ratio of watts per cubic unit, or heating rate, is established, the armature 140 assumes a neutral position, this neutral position being obtainable by the adjustment of potentiometer 27.

The automatic thickness control operates as follows. Assuming a case where the work specimen is thicker than the normal specimen for which the heating rate was initially adjusted as indicated on the thickness dial 149, the load current would then be less than normal because the effective series resistance of the particular specimen 114 would be greater than normal, and it would thus absorb less power from the oscillator. Now, the force resulting from the volume product, that is, the traction force between coil 162 and 163 would preponderate over the traction force resulting from the power product, that is, between coils 160 and 161, the differential causing the armature 140 to be actuated to the left, closing the respective contacts. The motor 131 will then rotate to move the thickness control to a new setting of a greater value in accordance with the thickness of the specimen, and the center electrode of condenser 110 will be adjusted to increase the load potential, current, and power, and thus the input power to the oscillator until the traction forces on relay 141 are balanced. The reverse action takes place if the work specimen is of less thickness than rated.

The same safety feature is included in the thickness control as in the area control, that is, if the regulatory period for adjustment for thickness is longer than that required for safe operation, the coil 75 is energized over conductors 133 and 159 at the same instant that the motor 131 is energized, and should the regulatory period extend over delay setting of the coil 75, the power to the oscillator will be reduced and again restored after regulation has been completed.

The above automatic features provide an inherent stable operating condition since any forces or motions causing a displacement from the normal conditions produces counteracting forces or motions in the opposite direction to restore a balanced condition predetermined by the manual setting of the heating rate control 27. That is, the area control is based on variations in total capacitance of condenser 110 and specimen 114, which affects the grid current, resulting in an adjustment of the bottom electrode of the condenser 110b. Similarly, since the rate of heating is directly proportional to the voltage per inch of thickness of the specimen, changes in the products of the area and thickness are made to balance the output power to the specimen. Thus, should the output power vary, caused by variations in thickness of the specimen, or by changes of electrical properties of the material which usually occur because of the temperature change, these changes will be reflected in the differential between output power and the volume of the specimen. It will be observed, therefore, that not only may there be differences in area and/or thickness between different specimens, but also variations in electrical properties, and an automatic adjustment will be made accordingly. Thus, it is only necessary for an operator to predetermine the rate of heating desired by adjustments of potentiometers 27 and 88 after which the system will provide the same heating rate for all specimens regardless of their shape, size, or electrical properties within the capacity of the system.

If the electrical properties, such as "loss factor" or "power factor" vary, either as a result of heating, or as a result of differences between specimens treated, automatic readjustment of power will result, even though the dial indication of thickness may not then check with the actual measured thickness of the material. In this sense, the dial calibrations are not necessarily precise unless several scales are provided on one dial to provide for variations of dielectric constant, power factor, and loss factor of the material. The area and thickness dials, however, are particularly useful for a preliminary setting of the electrodes of condenser assembly 110.

One preferred form of generator in accordance with the invention utilized type RCA 833A tubes for the oscillator at 5 and 6, type RCA 8008 rectifier tubes at 18, 19, 20, and 21, and a type RCA 83 rectifier for tube 53. The coupling capacitor 105 had 200 micromicrofarads and capacitor 116 had 0.002 microfarads. The plate choke 13 and the bleeding reactor 116 were 10 microhenries each, while the inductance of reactors 92 and 94 were 0.5 microhenries shunted by resistors of 100 ohms each. The resistance of resistors 87, 88, and 89 were 250 ohms, 500 ohms, and 5 ohms, respectively, the resistance of resistors 81, 83, and 84 were 1 ohm each, the resistance of resistor 82 was 100 ohms, and the resistance of resistor 85 was 125 ohms. The filter inductor 25 had an inductance of 5 henries, while the potentiometer resistor 27 had a resistance of 250 ohms. The high voltage impressed upon the rectifier tubes with switch 71 in the right-hand or high power position was approximately 3650 volts, while the voltage impressed on these tubes with the switch 71 in its left-hand or low power position was 1875 volts. The interval timer 58 is well-known as a "Controlflex" timer. The other elements of the system are well-known, although it might be stated that the resistance of each coil of the double polarized relay 138 and relay 141 was approximately 500 ohms.

The infrared lamps are for heating the load electrodes during the heating cycle to supplement the heating by radio frequency power, and the lamps are energized when the safety cage over the electrodes is moved to closed position. The closing of the safety cage also closes switch 57 so that the relay 48 can be energized, the cage being held closed by electric door latch 63 which is tripped by timer 58 after a predetermined heating period.

In a preferred form, the oscillator frequency was approximately 27.4 megacycles, obtained when inductor 106 had two microhenries, inductor 107, three microhenries, condenser 111, 200 micromicrofarads, and the total capacitance of condenser assembly 110 together with the load was 50 micromicrofarads. This permitted the capacitance of the load to vary from zero to 50 micromicrofarads, it being noted that the two sections of the condenser assembly 110 are in series, while the lower section is connected in parallel with the load capacitance so that if the upper section 110a of condenser assembly 110 had an infinite capacitance and the load had zero capacitance, the lower section 110b has 50 micromicrofarads. Now, if the upper section had 50 micromicrofarads and the load capacitance was zero, the lower section would then have infinite capacitance. Another combination to obtain 50 micromicrofarads over-all capacitance would be for the upper and lower sections to each have 100 micromicrofarads and the load zero capacitance.

The upper section of condenser assembly 110 is in series with the circuit from the tank circuit to the load and is varied by the motion of the central electrode relative to the upper and lower electrodes. The radio frequency current through this upper section is constant since the tank frequency and voltage are constant and the combined parallel capacitance of the load and the lower section of condenser assembly 110 is held constant. Thus, the potential across the upper section of the condenser assembly 110 is inversely proportional to the capacitance. Furthermore, since the same current flows through the lower section and the load in parallel as through the upper section, the potential across the lower section is inversely proportional to the combined capacitance of the load and the lower section. The variable condenser assembly 110 thus serves as a voltage divider, dividing the total voltage across its outer electrodes into two portions in inverse relationship to the capacitance of the two sections, the lower capacitance including that of the load.

The variation of capacitance in this design is accomplished by a variation in the spacing between the electrodes of condenser assembly 110 so that the potential gradient will be constant, movement of the central electrode bearing a linear relationship to the change in potential across the upper section. However, since the lower section is connected in parallel with the load, any movement of the lower electrode to maintain the over-all capacitance constant, makes it necessary that the capacitance of the lower section vary in a manner so that the relationship between this combination and the area dial indications and voltage variations across potentiometer 151 be hyperbolic. Mathematically stated, this relationship is:

$$S = K_1 \left( \frac{K_2}{1 - K_3 A} - K_4 \right)$$

where S is the spacing between lower section electrodes, A is the area dial indications, and $K_1$, $K_2$, $K_3$, and $K_4$ are constants determined by dielectric materials, area of the electrodes, and over-all capacitance.

Thus, differing from the linear relationship between the thickness dial indications or voltage variations across potentiometer 152 and movement of the central electrode, movement of the lower electrode is not linear with respect to the area dial indications or the voltage variation across the potentiometer 151 but in accordance with the above relationship. This hyperbolic relationship may be accomplished in any well-known manner such as variably winding the potentiometer 151 in a taper or by providing a hyperbolic mechanical link or cam mechanism between the shaft of pointer 144 directly connected to a uniformly wound or linear potentiometer and the lower electrode of condenser 110b. The motor 130 may be connected to the shaft of pointer 144 as shown or to any other moving part of the mechanism as long as the movement between the lower electrode of condenser 110 and the voltage variation across potentiometer 151 is related as stated above.

I claim as my invention:

1. An electrical generator system for heating a load with current from said system comprising a vacuum tube having an anode, grid, and a cathode, a feedback circuit between said anode and said grid, a tuned circuit connected to said anode, grid, and cathode, said tuned circuit including inductance and capacitance determined by the capacitance of a multiple-electrode variable condenser having two adjustable electrodes and the capacitance of said load connected to said system, the capacitance of said variable condenser and said load capacitance determining the feedback current in said feedback circuit connected to the grid of said tube, means for supplying said generator with direct current for the anode of said tube, and plural motor means for varying the adjustment of the multiple electrodes of said variable condenser to maintain the total capacitance of said variable condenser and said load at a substantially constant value, said last-mentioned means including a first motor connected to one adjustable electrode of said variable condenser, a second motor connected to another adjustable electrode of said variable condenser, a power supply for said motors, and means for rotating one of said motors in one of two directions according to the variations in grid current caused by changes in the capacity of said load.

2. An electrical generator in accordance with claim 1 which includes a rectifier having an output current proportional to the D. C. anode voltage applied to said tube, said rectifier output current providing a reference to which said variations of grid current are compared to control the direction of rotation of said one of said motors.

3. An electrical generator system for heating a load with current from said system comprising a vacuum tube having an anode, cathode, and a grid, a tuned circuit connected to said anode, cathode, and grid, said tuned circuit including at least one inductor and a variable condenser having multiple adjustable electrodes, the inductance of said inductor and the capacitance of said variable condenser and capacitance of said load connected to said generator determining the frequency at which said generator oscillates, plural motor means for automatically adjusting the electrodes of said variable condenser for varying the capacitance thereof in accordance with variations in said load capacitance, and a polarized relay for utlizing the unbalance between a force proportional to the plate voltage of said generator, and a force proportional to the grid current of said generator, said relay means controlling the direction of rotation of one of said motor means in accordance with the differential between said forces for varying the adjustment of one of said electrodes of said variable condenser in accordance with the variations in capacitance of said load.

4. An electrical generator system in accordance with claim 3 in which said system includes additional relay means for obtaining a balance between forces proportional to the electrical power output of said generator and forces proportional to the volume of said load, said additional relay means controlling the direction of rotation of another of said motor means in accordance with the differential between said last-mentioned forces for varying the adjustment of another of said electrodes of said variable condenser in accordance with the power requirements of said load.

5. An electrical generator system in accordance with claim 3, said system including means for removing the power from the anode of said tube when the anode current exceeds a predetermined value, and means for reducing the anode voltage on said tube when the period of adjustment of said variable condenser exceeds a predetermined length of time.

FREDERICK G. ALBIN.

REFERENCES CITED

The following references are of record in the file of this patent:

UNITED STATES PATENTS

| Number | Name | Date |
|---|---|---|
| 1,658,953 | Theremin | Feb. 14, 1928 |
| 1,919,976 | Fitzgerald | July 25, 1933 |
| 2,051,773 | Dreyfus | Aug. 18, 1936 |
| 2,112,418 | Hart et al. | Mar. 29, 1938 |
| 2,179,261 | Keller | Nov. 7, 1939 |
| 2,251,277 | Hart et al. | Aug. 5, 1941 |
| 2,280,725 | Shepard | Apr. 21, 1942 |
| 2,293,851 | Rogers | Aug. 25, 1942 |
| 2,304,958 | Rouy | Dec. 15, 1942 |
| 2,306,763 | Somes | Dec. 29, 1942 |
| 2,324,525 | Mittelmann | July 20, 1943 |
| 2,396,004 | Gilbert | Mar. 5, 1946 |

FOREIGN PATENTS

| Number | Country | Date |
|---|---|---|
| 439,166 | Great Britain | Dec. 2, 1935 |

OTHER REFERENCES

Hoyler, Electronics, August 1943, page 92, (Reprint in Division 60.)